July 30, 1957

H. M. B. RECOPÉ DE TILLY BLARU 2,800,930

LIQUID DISTRIBUTING DEVICE

Filed Aug. 17, 1954

INVENTOR
HUBERT M.B. RECOPÉ DE TILLY BLARU

July 30, 1957
H. M. B. RECOPÉ DE TILLY BLARU
2,800,930
LIQUID DISTRIBUTING DEVICE
Filed Aug. 17, 1954
4 Sheets-Sheet 2
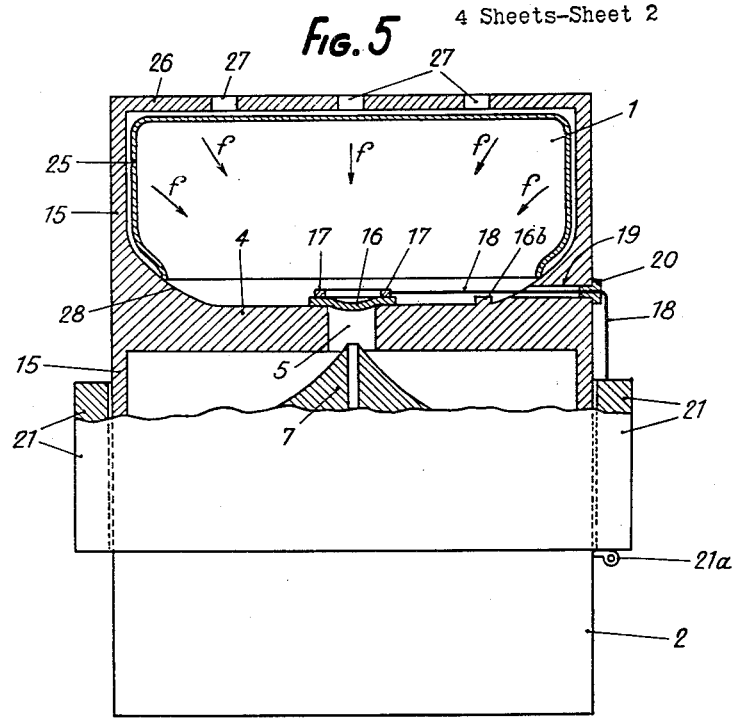
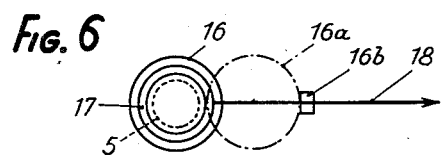
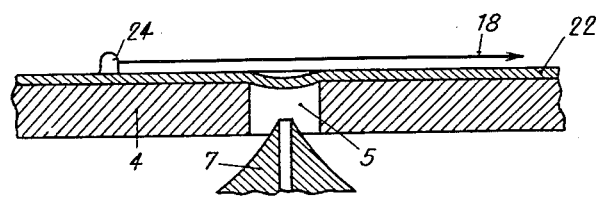
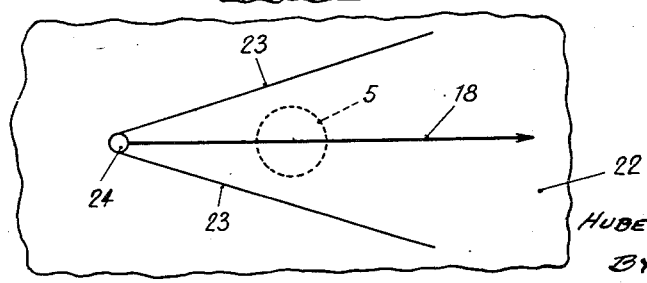
INVENTOR
HUBERT M.B. RECOPÉ DE TILLY BLARU
BY

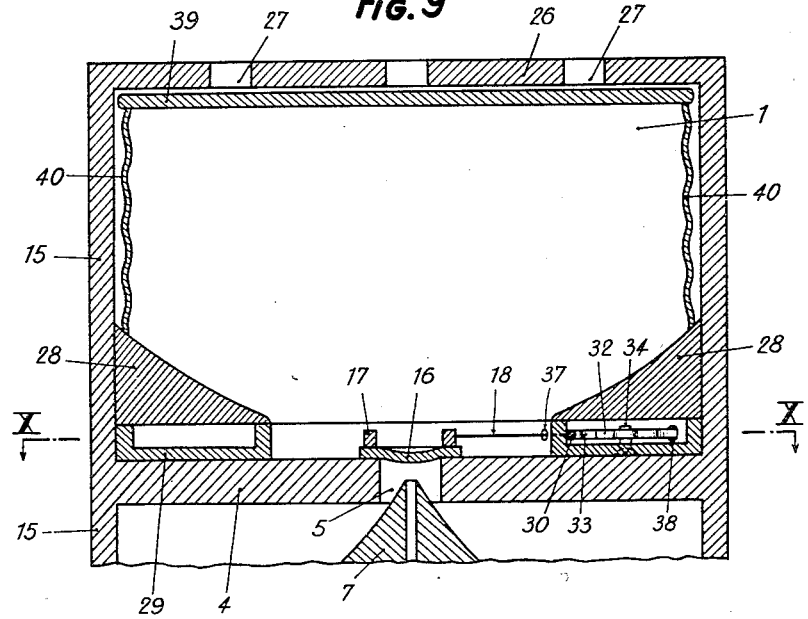
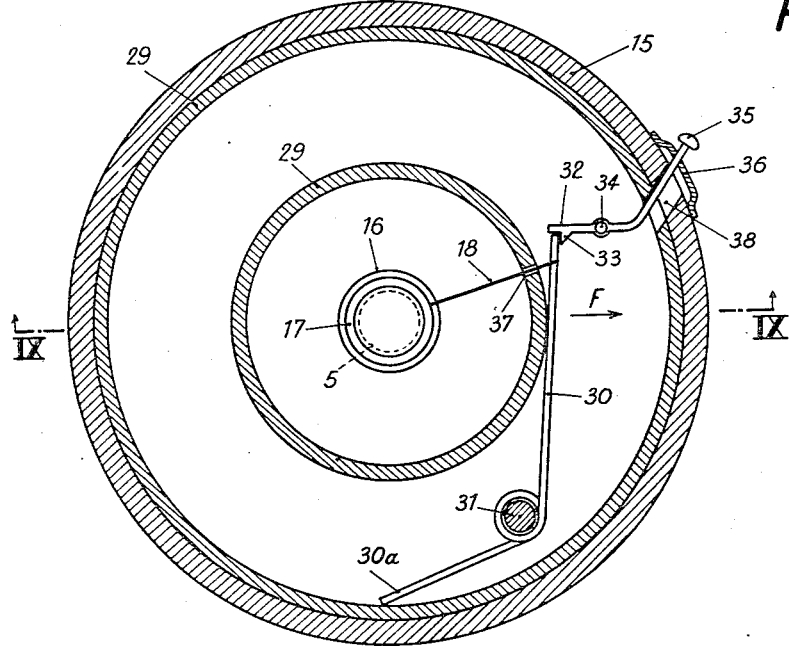

July 30, 1957 H. M. B. RECOPÉ DE TILLY BLARU 2,800,930
LIQUID DISTRIBUTING DEVICE
Filed Aug. 17, 1954 4 Sheets-Sheet 4

INVENTOR
HUBERT M.B. RECOPÉ DE TILLY BLARU
BY

United States Patent Office 2,800,930
Patented July 30, 1957

2,800,930

LIQUID DISTRIBUTING DEVICE

Hubert Marie Bernard Récopé de Tilly-Blaru,
Paris, France

Application August 17, 1954, Serial No. 450,492

Claims priority, application France October 9, 1953

20 Claims. (Cl. 141—238)

The present invention relates to a liquid distributing device for use in distributing a liquid in equal quantities to a number of chambers or containers, for example for introducing electrolyte or other liquid into the cells of an electric battery. In this latter case, the electrolyte must be prevented from producing short-circuits between the cells.

According to the invention, the uniform distribution of a liquid to a plurality of cells is obtained by a device comprising a cone-shaped distributing member whose vertex is concentrically positioned in a liquid admission aperture so as to form an annular constricted passage between said vertex and the edge of said aperture, said cone-shaped distributing member being provided on its surface with vertical partitions running from the center towards the periphery and defining separate passages each of which communicates near the center with said constricted passage, and near the periphery with the inlet aperture of one of the cells.

Preferably, the cone-shaped distributing member has a curved generatrix, so as to deviate the jets of liquid progressively from the liquid admission aperture towards the inlet apertures of the cells.

The cone-shaped distributing member may have an axial bore for feeding liquid either to a central cell or to one or more subjacent distributing devices.

The invention further relates to closure means for said liquid admission aperture, which means are adapted to be opened in a manner which ensures a smooth flow of the jet of liquid through said aperture.

Said closure means is formed by a flat closure member which is removably mounted over said aperture and is adapted to be removed therefrom by a force parallel to the surface on which said closure member is mounted.

This closure member may be a patch of rubber or similar material which is removably mounted over the liquid admission aperture and retained, for example, by a vacuum in the cells. When it is desired to introduce the liquid into the cells, said path is displaced laterally, by a traction or a push parallel to its plane. This displacement is easily effected, since only the sliding friction is to be overcome.

According to another embodiment, the closure member comprises a film adhering to the wall in which the liquid admission aperture is formed and covering said aperture, said film being formed with rupturing creases enframing said aperture and being connected to a member adapted to tear away the portion of film between said creases.

The drawing or pushing member for removing the closure member from the liquid admission aperture may be actuated manually, or by an inertia effect, or by a mechanism comprising a previously tensioned and locked force storing element, the unlocking of said element causing the displacement of the closure member and, as a consequence, the admission of the liquid into the cells.

In order to ascertain a regular entry of the liquid into the liquid admission aperture and to prevent the formation of a vortex causing a premature penetration of air, the liquid contained in the reservoir from which it is to be fed to the cells is enclosed by a bag formed at least partially of impermeable flexible material.

The invention also relates to means for preventing the liquid, once it has been distributed in the cells, from flowing back, for example under the effect of gravity when the device is turned upside down, or under the effect of forces of inertia.

Such backflows of liquid are detrimental in general, since they disturb the previously effected correct distribution of the liquid. In the case of an electric battery, such backflows of liquid have the further drawback of causing short-circuits between the cells of the battery.

According to the invention, the passages to be traversed by the liquid on its way from the liquid admission aperture to the inlet apertures of the cells have along at least part of their length a very small height, so that in this part their upper and lower walls constitute closely adjoining laminae.

The distance separating these closely adjoining laminae is determined, according to the properties of the liquid to be distributed, so as to prevent the return of said liquid, but without hindering the outward passage of the annular jet of liquid emerging from the constricted passage formed by the vertex of the cone-shaped distributing member in the liquid admission aperture.

Several embodiments of the invention will now be described with reference to the appended drawings.

Fig. 5 is an elevation, partly in section, of a second embodiment of the distributing device.

Fig. 6 is a plan view of the closure member of the device according to Fig. 5.

Fig. 7 is a fragmentary vertical section of another embodiment of the closure member.

Fig. 8 is a fragmentary plan view of the closure member of Fig. 7.

Fig. 9 is a partial axial section of a third embodiment of the distributing device, taken on line IX—IX of Fig. 10.

Fig. 10 is a cross section on line X—X of Fig. 9.

Figure 1:
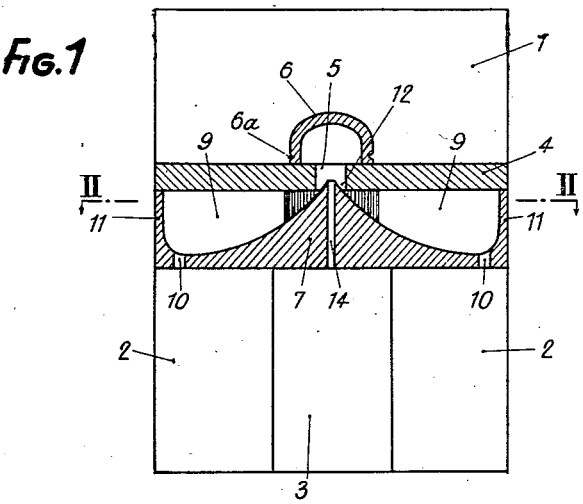
Fig. 1 is an axial section of a first embodiment of the distributing device, on line I—I of Fig. 2.
Figure 3A:
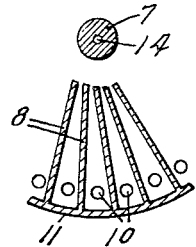
Figs. 3a and 3b are partial sections similar to that of Fig. 2, showing two modifications.
Figure 3B:
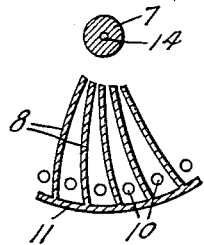
Figure 2:
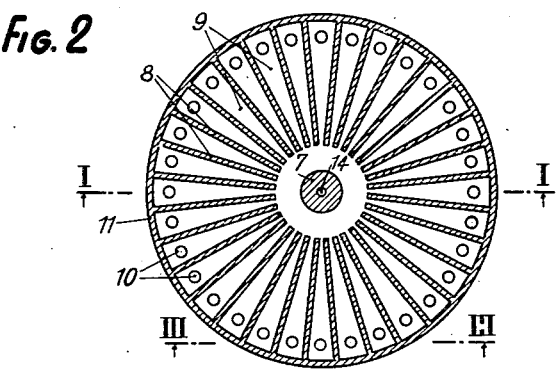
Fig. 2 is a cross section on line II—II of Fig. 1.
Figure 3:
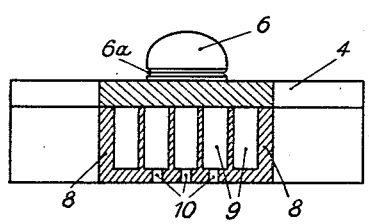
Fig. 3 is a section on line III—III of Fig. 2.

Referring to the first embodiment shown on Figs. 1 to 3, the reference 1 designates the reservoir containing the liquid to be distributed, and 2 is a battery comprising cells placed in a circle around a central cell 3.

The plate 4, which constitutes the bottom of the reservoir 1, is formed with a central aperture 5 which is normally closed by a cap 6 having at its base a rupturing groove 6a.

Above the battery 2 and concentrically thereto is located a cone-shaped distributing member 7 whose vertex extends into the aperture 5 and forms with the edge of the latter an annular constricted passage 12.

On its upper surface, which has preferably a curved generatrix, the cone 7 carries vertical partitions 8 running from the center towards the periphery and forming separate passages 9 the number of which is equal to that of the cells 2. Near the center, each passage 9 communicates with the constricted passage 12, and near the periphery an aperture 10 connects each passage 9 to the subjacent cell 2. A wall 11 surrounding the cone 7 supports the plate 4.

The partitions 8 are preferably radial, as shown in Fig. 2, but they can also be disposed obliquely to the radius, or be spiral-shaped, as shown in Figs. 3a and 3b respectively.

Figure 4:
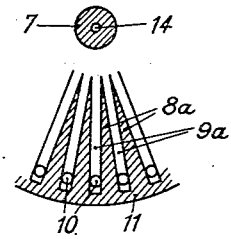
Fig. 4 is a partial section similar to that of Fig. 2, showing a further modification.

When the thickness of the partitions 8 is uniform, the width of the passages 9 increases towards the periphery, as shown in Fig. 2. According to the third modification shown in Fig. 4, passages 9a of uniform width are obtained by the provision of partitions 8a whose thickness decreases towards the center.

In the illustrated example, it may be assumed that the cells 2 have been exhausted and that atmospheric pressure is exerted on the liquid in the reservoir 1. In order to distribute the liquid in the cells, the cap 6 is ruptured by any convenient means (not shown) so as to uncover the aperture 5. Under the effect of atmospheric pressure, the liquid contained in the reservoir 1 is forced through the aperture 5, is partially arrested by the constricted passage 12 and emerges from the latter as an annular jet or stream which follows the surface of the cone 7 and flows uniformly into all the passages 9 each of which leads, through the respective apertures 10, to one of the cells 2. Equal portions of liquid are thus distributed in the cells.

When a central cell 3 or a subjacent distributing device is to be supplied at the same time, the cone 7 is formed with an axial passage 14 leading to said central cell or subjacent device. The section of the passage 14 will be determined, with respect to that of the annular constricted passage 12, according to the quantities of liquid which are to be passed through each of them.

With the distributing device which has been described, when applied to an electric battery, short-circuits between the cells are impossible, since the length of the leakage paths from one cell to another is at least twice the length of one of the passages 9.

In the fourth embodiment shown in Figs. 5 and 6, wherein the same references have been used for designating similar parts, the casing 15 contains in its upper part the liquid reservoir 1 and in its lower part the cells 2 into which the liquid from the reservoir 1 is to be fed through the aperture 5 formed in the plate 4, the distribution of the liquid being effected by the cone 7.

The aperture 5 is closed by a patch 16 of rubber or similar material which is mounted on the plate 4 over the aperture 5 and retained in position by vacuum in the cells 2.

The patch 16, the edge of which may be provided with a stiffener 17, is attached to a flexible draw string 18 by means of which it can be pulled from covering relation to the aperture 5, by a traction exerted in a parallel direction to the surface of the plate 4. A stop 16b arrests the patch 16 in the position 16a (Fig. 6) in which it has completely uncovered the aperture 5.

In the illustrated example, the string 18 extends through the envelope 15 through a narrow passage 19 and is adapted to be actuated from outside by a sudden traction, either manually or by means of a device. A convenient cap or seal 20 conveniently prevents the liquid from escaping through the passage 19.

In the embodiment shown on Fig. 5, the string 18 is attached to a heavy ring 21 which is normally supported by a safety pin 21a. After removal of this pin, the liquid distributing device may be put into action either by pushing the ring 21 downwards, or by imparting to the whole device an upward acceleration, so that the heavy ring 21 will by reason of its inertia exert a sudden traction upon the string 18.

The liquid contained in the reservoir 1 is surrounded by a bag 25 formed of flexible material which contracts, as indicated by the arrows f, and thus ensures the regular entry of the liquid into the aperture 5, under the effect of atmospheric pressure acting through the openings 27 in the envelope cover 26. The peripheral portions 28 of the bottom of the reservoir 1 preferably are inclined toward the center to facilitate the flow of the liquid towards the aperture 5.

According to the embodiment shown on Figs. 7 and 8, the closure member for the aperture 5 is a film of plastic material 22 which adheres to the plate 4 and covers the aperture 5. This film 22 is formed with rupturing creases 23 which are in joining or intersecting relation and enframe the aperture 5. A draw string 18 is attached to the film 22 at the point 24 where the creases 23 meet. By a sudden traction exerted upon the string 18 in the direction of the arrow, the portion of the film 22 between the rupturing creases 23 is torn away and the aperture 5 is uncovered. In this case also, the pull may be exerted upon the string 18 by any convenient means.

Figs. 9 and 10 show another embodiment of the liquid distributing device, in which the uncovering of the aperture is effected by a mechanism comprising a previously tensioned and locked force storing element. The closure of the aperture is, as in Fig. 5, a patch 16 attached to a draw string 18, but the latter, instead of being led to one leg of the outside, is attached to a spring 30 located in the cavity of a hollow disk 29 placed between the plate 4 and the crater-shaped bottom 28 of the liquid reservoir 1. The spring 30 is coiled around a pin 31 fixed on the disk 29 and one leg 30a of the spring abuts against the outer rim of the disk 29. In the position shown on Fig. 10, the spring 30 is tensioned and locked by a catch 33 on a small lever 32 which is pivotally mounted on a pin 34 anchored in the disk 29, said catch engaging the other end of the spring. The tensioned spring 30 urges in the direction of the arrow F (Fig. 10). The small lever 32 is actuated by a knob 35 which protrudes to the outside, through a slot 38 formed in the outer rim of the disk 29 and the casing 15. A safety cap 36 prevents an accidental displacement of the knob 35, so that the mechanism can be actuated only after removal of said cap.

If this liquid in the reservoir 1 is to be prevented from flowing into the cavity containing the spring 30 and the lever 32, a fluid tight seal is disposed in the passage 37 through which the string 18 traverses the inner rim of the disk 29. On the other hand, if the said cavity is filled with liquid, a tight seal is provided in the passage 38 around the lever 32. If desired, seals may be provided for both passages 37 and 38 to ensure against escape of liquid.

In the embodiment shown on Fig. 9, the bag which encloses the liquid in the reservoir 1 is composed of a peripheral flexible bellows 40 and a stiffer top plate 39. The latter is however sufficiently flexible to bend into the conical crater 28 as the liquid is totally discharged from the reservoir 1.

The operation of the mechanism is easily understood. After removing the safety cap 36, the knob is pushed clockwise (Fig. 10). The catch 33 of the lever 32 is thereby disengaged from the arm of the spring 30 which swings in the direction of the arrow F and pulls the string 18, thus suddenly removing the patch 16 from the opening 5.

The invention is not limited to the specific example of the mechanism shown on Figs. 9 and 10. The disposition of the spring or other force storing element and of its locking means may vary without departing from the scope of the invention. The mechanism can also be placed outside the casing 15, instead of being located inside.

Figure 11:
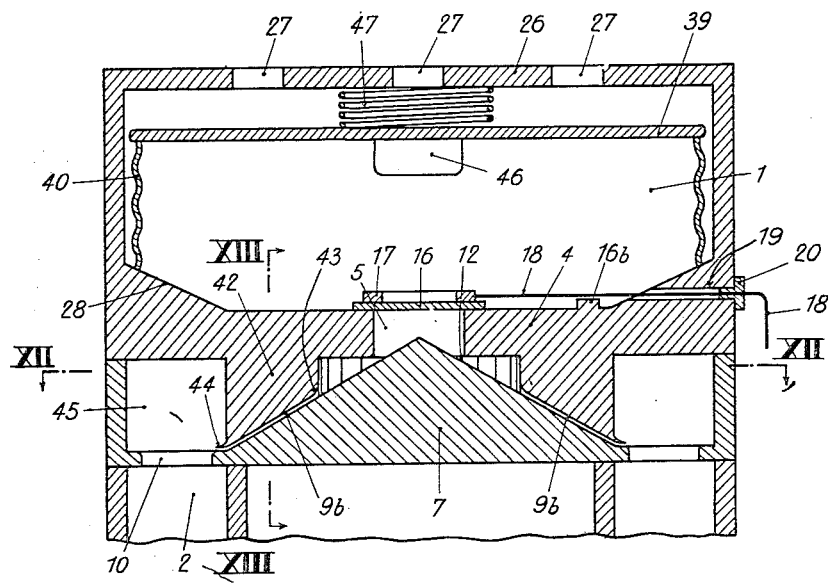
Fig. 11 is a partial axial section of a fourth embodiment of the liquid distributing device.
Figure 12:
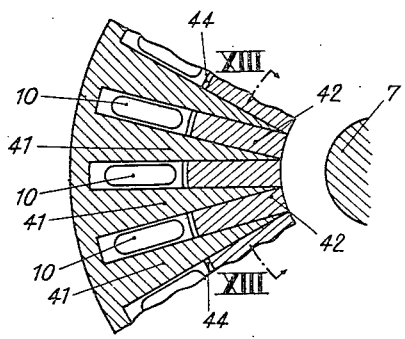
Fig. 12 is a partial cross section on line XII—XII of Fig. 11.
Figure 13:
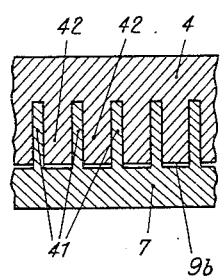
Fig. 13 is a partial section taken along the cylindrical surface indicated by the lines XIII—XIII on Figs. 11 and 12 and developed in the plane of the drawing.

Another embodiment of the liquid distributing device is shown on Figs. 11 to 13, wherein similar parts are designated by the same references as in the previously described embodiments. 1 is the liquid reservoir, 2 are the cells in which the liquid from said reservoir is to be distributed, 4 is the bottom plate formed with the aperture 5, and 7 is the distributing cone the vertex of which forms with the periphery of said aperture the annular constricted passage 12.

The aperture 5 is normally closed by the closure member 16—17 which can be suddenly removed from said aperture by a sudden pull exerted upon the draw string 18 by any suitable means (not shown).

The cone 7 carries partitions 41 forming separate passages leading to the inlet apertures 10 of the cells 2. A part of each of said passages has its height reduced by an insert 42 which depends from the plate 4 and snugly fits between the adjacent partitions 41 with its lower surface very close to the surface of the cone 7. Within the extent of each insert 42 there is thus formed a passage 9b the height of which is very small (see Figs. 11 and 13) and whose upper and lower walls constitute substantially plane, closely adjoining laminae. The height of the section of the passages 9b is determined, according to the properties of the liquid to be distributed, in such manner that the closely adjoining laminae limiting said passages do not allow the liquid, once it has entered the cells 2, to return towards the vertex of the cone, whatever be the position of the device and the forces of inertia acting thereon. At the same time, the height of the passages 9b must be such that the jet or flow of liquid issuing from the constricted passage 12 may pass through said passages 9b without hinderance. A round-off 43 of convenient radius may be provided at the inlet end of each passage 9b.

At the outlet end of each passage 9b the insert 42 may be provided with a thin lip or flap 44 to act as a valve flap opposed to the return of liquid from the cell 2 into the passage 9b.

The length of the passages 9b is not necessarily that shown on the drawings. These passages may start at a lesser or greater distance from the annular constricted passage 12, due to a convenient shape given to the partitions 41 and to the inserts 42.

Above the inlet apertures 10 of the cells 2 there are expansion chambers 45 adapted to receive gases which may be evolved, for example, in the case of an electric battery. These chambers are however optional. They may be dispensed with, for example in applications where no evolution of gas is to be expected.

In the previously described embodiments, it has been assumed that the cells have been exhausted, and that the liquid is urged from the reservoir into the cells by atmospheric pressure acting thereon. The injection of the liquid into the cells may however also be effected by means of a spring 47 (Fig. 11), of an inflated bladder or similar means for exerting a pressure upon the liquid contained in the reservoir 1. These means (vacuum, spring, bladder, etc.) may be applied separately or in combination.

In order to ensure complete ejection of the liquid after opening the closure member 16, including the residual quantity in the aperture 5, the top wall 39 of the flexible bag 39—40 enclosing the liquid may be provided with a projection 46 which penetrates into the aperture 5 and drives the liquid therefrom towards the cells 2. The shape of the projection 46 is to be designed so as to leave the least possible liquid in the reservoir. Instead of the projection 46, there may be provided a gas-filled bulb which will be broken by engagement with the vertex of the cone 7, or on a point provided thereon. The compressed gas thus released from this bulb drives the residue of liquid towards the cells 2.

It will be understood that the invention is not limited to the embodiments which have been described and shown, but covers also modifications thereof, within the scope of the appended claims.

I claim:

1. A device for distributing a liquid in a plurality of cells, comprising a wall formed with a liquid admission aperture, a cone-shaped distributing member below said wall, the vertex of said cone-shaped distributing member being received into said aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells.

2. A device as claimed in claim 1, wherein said cone-shaped distributing member has a curved generatrix so that the jets of liquid are progressively deviated from said liquid admission aperture towards said inlet apertures of the cells.

3. A device for distributing a liquid in a plurality of cells, comprising a wall formed with a liquid admission aperture, a cone-shaped distributing member below said wall, the vertex of said cone-shaped distributing member being received into said aperture so as to form an annular constricted passage between said vertex and the edge of said admission aperture, and partitions on the surface of said distributing member, said partitions being directed radially from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells.

4. A device for distributing a liquid in a plurality of cells, comprising a wall formed with a liquid admission aperture, a cone-shaped distributing member below said wall, the vertex of said cone-shaped distributing member being received into said aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells, and said distributing member being formed with an axial bore communicating with a subjacent central cell.

5. A device for distributing a liquid in a plurality of cells, comprising a wall formed with a liquid admission aperture, a cone-shaped distributing member below said wall, the vertex of said cone-shaped distributing member being received into said aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells, and said distributing member being formed with an axial bore communicating with a subjacent distributing device.

6. A device for distributing a liquid in a plurality of cells, comprising a wall formed with a liquid admission aperture, a removable closure member normally closing said admission aperture, a cone-shaped distributing member below said wall, the vertex of said cone-shaped distributing member being received into said aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells.

7. A device for distributing a liquid in a plurality of cells, comprising a wall formed with a liquid admission aperture, a flat closure member on the upper surface of said wall, normally closing said admission aperture and adapted to be removed from said admission aperture by a force applied to said closure member in a direction parallel to said upper surface, a cone-shaped distributing member below said wall, the vertex of said cone-shaped distributing member being received into said aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells.

8. A device for distributing a liquid in a plurality of cells, comprising a wall formed with a liquid admission aperture, a flat closure member on the upper surface of said wall, normally closing said admission aperture and adapted to be removed from said admission aperture by a force applied to said closure member in a direction parallel to said upper surface, means for exerting upon said closure member a force in said direction so as to remove said closure member from said admission aperture, a cone-shaped distributing member below said wall, the vertex of said cone-shaped distributing member being entered into said aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells.

9. A device as claimed in claim 8, wherein said means is a traction element.

10. A device as claimed in claim 8, wherein said means is a push element.

11. A device as claimed in claim 8, wherein said means comprise a heavy element connected to said closure member.

12. A device for distributing a liquid in a plurality of cells, comprising a wall formed with a liquid admission aperture, a flat closure member on the upper surface of said wall, normally closing said admission aperture and adapted to be removed from said admission aperture by a force applied to said closure member in a direction parallel to said upper surface, means for exerting upon said closure member a force in said direction so as to remove said closure member from said admission aperture, a cone-shaped distributing member below said wall, the vertex of said cone-shaped distributing member being entered into said aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells, said means comprising a force storing element connected to said closure member, locking means engageable with said force storing element for locking said force storing element in tensioned position, and releasing means for disengaging said locking means from said force storing element.

13. A device for distributing a liquid in a plurality of cells, comprising a wall formed with a liquid admission aperture, a film secured to the upper surface of said wall and covering said admission aperture, said film being formed with rupturing creases enframing said admission aperture, means for tearing away the portion of said film between said rupturing creases, a cone-shaped distributing member below said wall, the vertex of said cone-shaped distributing member being entered into said aperture so as to form an annular constricted passage between said vertix and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells.

14. A device for distributing a liquid in a plurality of cells, comprising a wall formed with a liquid admission aperture, a cone-shaped distribution member below said wall, the vertex of said cone-shaped distributing member being entered into said aperture so as to form an annular constricted passage between said vertex and the edge of said admission aperture, and partitions on the surface of said distributing member, said partitions being directed from the center towards the periphery of said distributing member and forming liquid supply passages therebetween, each of said supply passages having along at least part of its length a very small height, said member having a plurality of apertures adjacent the periphery thereof with each aperture constituting an inlet to one of said cells, and each of said supply passages communicating at its inner end with said annular constricted passage and at its outer end with the inlet aperture of one of said cells.

15. A device for distributing a liquid in a plurality of cells, comprising a wall formed with a liquid admission aperture, a cone-shaped distributing member below said wall, the vertex of said cone-shaped distributing member being entered into said aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages including a passage portion of very small height extending along at least part of its length and whose upper and lower walls constitute closely adjoining laminae, and each of said supply passages communicating at its inner end with said annular constricted passage and at its outer end with the inlet aperture of one of said cells.

16. A device as claimed in claim 15, in which the distance separating said closely adjoining laminae is determined according to the properties of the liquid to be distributed, so as to prevent the return of said liquid, without hindering the outward passage of an annular jet of liquid emerging from said annular constricted passage.

17. A device for distributing a liquid in a plurality of cells, comprising a wall formed with a liquid admission aperture, a cone-shaped distributing member below said wall, the vertex of said cone-shaped distributing member being entered into said aperture so as to form an annular constricted passage between said vertex and the edge of said admission aperture, and partitions on the surface of said distributing member, said partitions being directed from the center towards the periphery of said distributing member and forming liquid supply passages therebetween, each of said supply passages including a passage portion of very small height extending along at least part of its length, a round-off being formed at the inner end of the upper wall of each of said passage portions of very small height, said member having a plurality of apertures adjacent the periphery thereof with each aperture constituting an inlet to one of said cells, and each of said supply passages communicating at its inner end with said annular constricted passage and at its outer end with the inlet aperture of one of said cells.

18. A device for distributing a liquid in a plurality of cells, comprising a wall formed with a liquid admission aperture, a cone-shaped distributing member below said wall, the vertex of said cone-shaped distributing member being entered into said aperture so as to form an annular constricted passage between said vertex and the edge of said admission aperture, and partitions on the surface of said distributing member, said partitions being directed from the center towards the periphery of said distributing member and forming liquid supply passages therebetween, each of said supply passages including a passage portion of very small height extending along at least part of its length, a thin flap at the outer end of the upper wall of each supply passage to act as a non-return valve flap at the outer end of each of said passage portions of very small height, said member having a plurality of apertures adjacent the periphery thereof with each aperture constituting an inlet to one of said cells, and each of said supply passages communicating at its inner end with said annular constricted passage and at its outer end with the inlet aperture of one of said cells.

19. A device for distributing a liquid in a plurality of cells, comprising a liquid reservoir having a bottom wall formed with a liquid admission aperture, a removable closure member normally closing said admission aperture, resilient means exerting pressure upon the liquid in said reservoir, means for removing said closure member from said admission aperture, a cone-shaped distributing member below said wall, the vertex of said cone-shaped distributing member being entered into said admission aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells.

20. A device for distributing a liquid in a plurality of cells, comprising a liquid reservoir having a bottom wall formed with a liquid admission aperture, a removable closure member normally closing said admission aperture, means for removing said closure member from said admission aperture, a flexible bag enclosing the liquid in said reservoir, a projection depending from the top wall of said bag and adapted to penetrate into said admission aperture when said bag is collapsed, a cone-shaped distributing member below said wall, the vertex of said cone-shaped distributing member being entered into said admission aperture so as to form an annular constricted passage between said vertex and the edge of said admission aperture, and partitions on the surface of said distributing member, said partitions being directed from the center towards the periphery of said distributing member and forming liquid supply passages therebetween, said member having a plurality of apertures adjacent the periphery thereof with each aperture constituting an inlet to one of said cells, each of said supply passages communicating at its inner end with said annular constricted passage and at its outer end with the inlet aperture of one of said cells.

References Cited in the file of this patent

UNITED STATES PATENTS

| 41,097 | Sawyer | Jan. 5, 1864 |
| 639,486 | Wright | Dec. 19, 1899 |
| 1,517,502 | Grissom et al. | Dec. 2, 1924 |